L. R. HIBBARD.
THREADED FASTENING.
APPLICATION FILED MAY 25, 1916.
1,244,499.
Patented Oct. 30, 1917.
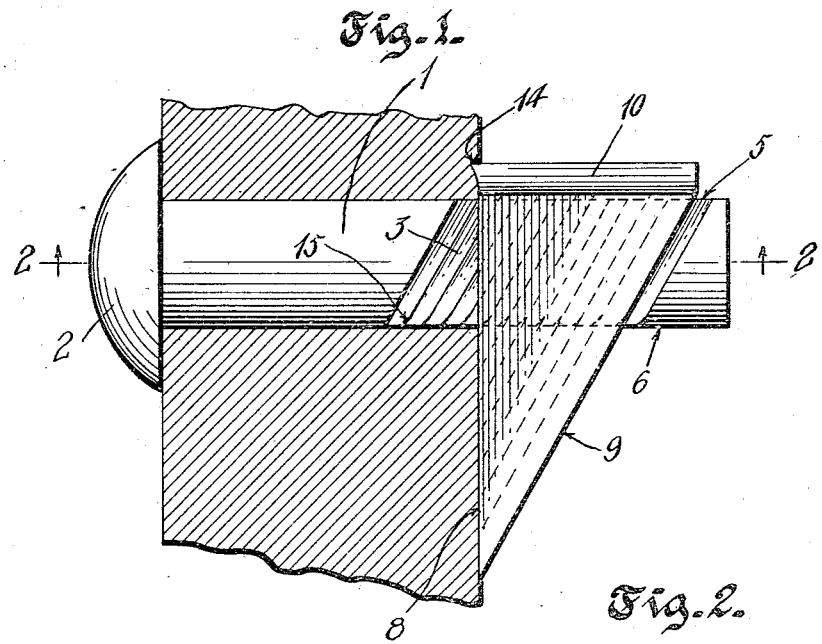
Fig. 1.
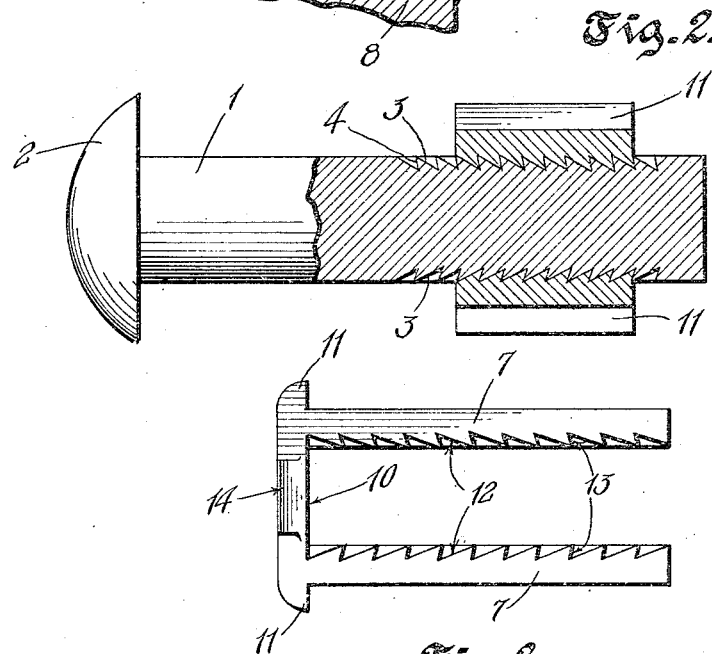
Fig. 2.
Fig. 3.
INVENTOR
Luman Rex Hibbard
BY
ATTORNEY
WITNESSES

UNITED STATES PATENT OFFICE.

LUMAN REX HIBBARD, OF BATH, NEW YORK.

THREADED FASTENING.

1,244,499.  Specification of Letters Patent.  Patented Oct. 30, 1917.

Application filed May 25, 1916. Serial No. 99,860.

*To all whom it may concern:*

Be it known that I, LUMAN REX HIBBARD, a citizen of the United States, residing at Bath, in the county of Steuben and State of New York, have invented certain new and useful Improvements in Threaded Fastenings, of which the following is a specification.

This invention has relation to an improved nut and bolt, and the nature and objects thereof will be readily understood by those skilled in the art, in the light of the following explanation of the accompanying drawings; illustrating what I now believe to be the preferred embodiment of mechanical expression of my invention from among other forms and arrangements within the spirit thereof, and the scope of the appended claims.

However, an object of the invention is to provide an improved bolt upon which the threads are cut upon each side of the bolt at an obtuse angle to the length thereof and in straight lines, in contradistinction to the spiral manner of cutting the threads as employed in the ordinary bolt.

Another object of the invention, is to provide what may be termed a key for engagement and coacting with the bolt, somewhat after the fashion of the usual nut.

Another object of the invention is to provide an improved combination of a bolt and key of the character described, whereby the key may be adjusted more quickly upon the bolt than is possible with the nut and bolt of the usual type, and which will be held more firmly and securely thereon.

In addition to the foregoing, my invention comprehends improvements in the details of construction and arrangement of parts, to be hereinafter described and more particularly set forth in the appended claims.

In the accompanying drawings, in which similar and corresponding parts are designated by the same characters of reference throughout the several views in which they appear, Figure 1 is a view in side elevation of a bolt and key constructed after the manner of my invention, and shown in clamped engagement, Fig. 2 is a horizontal section taken on the line 2—2 of Fig. 1, Fig. 3 is a view in front elevation of the key.

In carrying out my invention I provide a bolt shank 1 having a head 2 at one end thereof. The shank of the bolt may be circular in cross section, and I have thus illustrated the bolt in the drawing, but it will be obvious that a bolt shank which is square in cross section will be equally well adapted for the purpose of my invention.

Upon opposite sides of the bolt shank are threads 3 which slant in one direction, and toward the head end of the bolt, the faces of the threads directed toward the head end being also slightly inclined as at 4. The threads are cut transversely across the shank and are disposed at an angle to the sides of the shank, said threads being straight and uniform in their length, so as to form smooth surfaces 5 and 6 upon opposite sides of the bolt.

After the shank of the bolt is inserted through the opening of the material to be clamped, a key is engaged upon the projecting end thereof. The key is formed of spaced side members 7 having faces 8 adapted to flatly engage the face of the work, and faces 9 which are disposed at an angle to the faces 8 thereby forming a key which is substantially wedge shaped. Adjacent edges of one of the sides of the member 7 are connected by a portion 10 which is provided with overhanging portions 11 thereby forming a head which may be struck with any suitable instrument, for driving the key into place.

The inner faces of the side members 7 of the key are formed with threads 12, which are inclined in an opposite direction to that of the threads on the bolt, and are also provided with incline faces 13 for engagement with the inclined faces 4 of the threads 3 of the bolt.

In view of the foregoing it will be obvious, that inasmuch as the threads 12 of the key are disposed at an angle parallel to the angle of the bolt threads, the wedge or key, may be placed in position upon the bolt so that the members 7 will engage opposite sides of the bolt, and if the head 10 of the key be struck, said key will become firmly seated in place owing to the frictional engagement of the bolt and key threads.

It will also be obvious that owing to the inclined faces 4 and 13 of the co-acting threads, the side members 7 of the key will be tightly drawn against the sides of the bolt, the head 10 of the key being somewhat resilient to permit such binding action. As a means for insuring, and maintaining the frictional engagement between the threads of the bolt and key, I provide a sharpened slightly projecting edge 14 upon the head of the key for the purpose of biting into the surface of the member to be clamped, thereby resisting accidental displacement of the key along the lines of the threads. I also prefer to form the ends of the bolt threads with sharpened corners 15, to more readily catch hold upon co-acting teeth of the key, in an obvious manner. In view of the foregoing, it will be apparent that I have provided an improved form of bolt, upon which the key may be engaged thereon and forced into position with greater quickness and facility, than is possible in the use of the bolt of spiral thread formation, and moreover threads of this type are more easily cut and at less expense, and may even be cast if desired. It will also be obvious that the key although held securely against accidental displacement, may be easily removed from the bolt by striking the under side of the head in a direction parallel to the threads.

Various ways of constructing my invention will occur to persons engaged in mechanical arts, and I therefore wish it understood that while I have illustrated my invention with some degree of particularity, I reserve the right and privilege of changing the form of the details and otherwise altering the arrangement of parts, without departing from the spirit of the invention and the scope of the appended claims.

Having thus fully described my invention what I claim as new and desire to secure by Letters Patent is:

1. The combination of a bolt having straight threads upon one side thereof, said threads being disposed at an angle to the length of the bolt, and a key having straight threads adapted to engage the threads of the bolt.

2. The combination of a bolt having straight threads upon one side thereof and extending transversely thereto and at an angle, and a key having threads adapted to engage the threads of the bolt, said key having one of its edges disposed at right angles to the bolt.

3. The combination of a bolt having straight threads upon one side thereof extending across the bolt and at an angle thereto, and a wedge shaped key having spaced members adapted to engage opposite sides of the bolt, the inner face of one of said sides having threads for engagement with the bolt threads.

4. The combination of a bolt having threads at one side thereof and disposed at an angle, a triangular key formed of spaced members connected at one end, the inner face of one of said members having parallel threads for engaging the threads of the bolt.

5. The combination of a bolt having straight threads on opposite sides thereof, extending transversely of the bolt and at an angle thereto, a wedge shaped key formed of spaced members for engaging opposite sides of the bolt the ends of the members being connected together, and the inner faces of the members having parallel threads for engagement with the bolt threads.

6. The combination of a bolt having threads at opposite sides extending across the bolt at an angle thereto, the ends of the threads having projecting corners, a wedge shaped key formed of spaced members adapted to engage opposite sides of the bolt, the ends of the members being connected together thereby forming a driving head, a sharpened projection on the head for engaging the work to be clamped thereby preventing displacement of the key, the inner faces of the members having threads for engagement with the threads of the bolts and the sharpened ends thereof.

In testimony whereof I affix my signature in presence of two witnesses.

LUMAN REX HIBBARD.

Witnesses:
W. G. DEAN,
D. B. BRYAN.

Copies of this patent may be obtained for five cents each, by addressing the "Commissioner of Patents, Washington, D. C."